United States Patent

[11] 3,631,232

[72] Inventors Donald A. Perreault
Pittsford;
Donald E. Mack, Rochester, both of N.Y.

[21] Appl. No. 867,348
[22] Filed Oct. 17, 1969
[45] Patented Dec. 28, 1971
[73] Assignee Xerox Corporation
Rochester, N.Y.

[54] APPARATUS FOR SIMULATING THE ELECTRICAL CHARACTERISTICS OF A NETWORK
8 Claims, 7 Drawing Figs.

[52] U.S. Cl. ........ 235/185, 235/197, 307/260, 325/42, 328/162, 333/29, 333/70 T
[51] Int. Cl. ........ G06g 7/62
[50] Field of Search ........ 235/181, 183, 184, 197, 150.53; 333/18, 28, 29, 70; 328/162–168; 325/42

[56] References Cited

UNITED STATES PATENTS

| | | | |
|---|---|---|---|
| 2,024,900 | 12/1935 | Wiener et al. | 333/29 X |
| 2,124,599 | 7/1938 | Wiener et al. | 333/29 X |
| 2,128,257 | 8/1938 | Yuk-Wing Lee et al. | 333/29 X |
| 2,869,083 | 1/1959 | Indjoudjian | 333/29 |
| 3,050,700 | 8/1962 | Powers | 333/29 |
| 3,292,110 | 12/1966 | Becker et al. | 333/18 |
| 3,482,190 | 12/1969 | Brenin | 333/29 |
| 3,505,512 | 4/1970 | Fricke et al. | 235/184 |

OTHER REFERENCES

Storch; Synthesis of Constant-Time-Delay Ladder Networks. Proceedings IRE Nov. 1966 p. 1666/1675

Thomas: Transport Time Delay Simulation for Transmission line Representation IEEE Transactions on Computers. Vol. C-17 No. 3 March 1968 p. 205–214.

*Primary Examiner*—Malcolm A. Morrison
*Assistant Examiner*—Felix D. Gruber
*Attorneys*—James J. Ralabate, Irving Keschner and John E. Beck

ABSTRACT: A method of simulating the electrical characteristics of a network by utilizing a tapped delay line, the output taps of which are connected to variable gain devices. The gain of said devices are computed and then adjusted to the computed value. The outputs of the variable gain devices are summed in a summing device, the ratio of the signal at the output of the summing device to the signal applied to the input of the tapped delay line corresponding to the simulated characteristic.

INVENTORS.
DONALD A. PERREAULT
DONALD E. MACK
BY Irving Keschner
ATTORNEY $$L_a = \frac{\varepsilon R_o}{\omega_o} \qquad C_a = \frac{1}{\omega_o \varepsilon R_o}$$

$$L_b = \frac{R_o}{\omega_o \varepsilon} \qquad C_b = \frac{\varepsilon}{\omega_o R_o}$$

$$L_1 = 2L_a = \frac{2\varepsilon R_o}{\omega_o} \qquad C_1 = \frac{C_a}{2} = \frac{1}{2\omega_o \varepsilon R_o}$$

$$L_2 = \frac{L_b}{2} = \frac{R_o}{2\omega_o \varepsilon} \qquad C_2 = 2C_b = \frac{2\varepsilon}{\omega_o R_o}$$

APPARATUS FOR SIMULATING THE ELECTRICAL CHARACTERISTICS OF A NETWORK

BACKGROUND OF THE INVENTION

In the field of transmission of electrical signals, telephone lines and cables provide readily available and reasonably cheap links for the transmission of electrical signals. Although these lines have been developed over the years to be suitable for voice transmissions, in normal use phase and amplitude distortion is introduced into the signals while being transmitted from one location to another. In addition, each transmission link may have different operating characteristics from one another. The telephone lines and cables have electrical and operating characteristics which are extremely poor for the transmission of data, since the data signals require that the phase of all frequency components be preserved in transmission whereas the phase of voice signals is immaterial because the ear is insensitive to phase. Data signals, in general, are also more sensitive to changes in the relative amplitude of their frequency components. Many systems have been devised to operate on the data once it has been transmitted to compensate for the distortion introduced by the transmission media. Examples of such systems are equalization systems, such as that disclosed in copending U.S. application Ser. No. 575,134, now U.S. Pat. No. 3,489,848 filed Aug. 25, 1966.

It would be desirable to apply the techniques used for simulating systems to transmission media such as transmission lines, so that desired transmission line characteristics, such as amplitude (attenuation) versus frequency or phase (envelope delay) versus frequency, may be simulated. This would provide a technique for testing the effects of transmission through transmission line in the laboratory so that the proper peripheral equipment may be selected to transmit a signal which has already been compensated for the distortion involved in transmission. Envelope delay (the first derivative of phase with respect to frequency) simulators are conventionally designed using a number of fixed or variable allpass networks in various combinations. However, these simulators generally lack flexibility to provide more than a limited number of characteristics and also do not provide a rigorous analytical procedure for producing prescribed functions.

SUMMARY OF THE INVENTION

The present invention provides a method for simulating the electrical characteristics of a network. In particular, the outputs of a tapped delay line are coupled to variable gain devices, the gains of which are computed in accordance with a mathematical procedure and then adjusted to the computed value. The output of the gain devices are summed in a summing device, the ratio of the output of the summing device to the signal applied to the input of the delay line corresponding to the simulated electrical characteristic.

It is an object of the present invention to provide a method for simulating the electrical characteristics of a network.

It is a further object of the present invention to provide a method for simulating the electrical characteristics of a network, such as a transmission line, including a tapped delay line the output thereof being weighted to a value calculated in accordance with a mathematical procedure, the ratio of the weighted output to the signal input to the delay line corresponding to the desired electrical characteristics.

It is still a further object of the present invention to provide a novel, simple, reliable and economical procedure for simulating the electrical characteristics of a network.

DESCRIPTION OF THE DRAWING

For a better understanding of the invention as well as other objects and further features thereof, reference is made to the following detailed description which is to be read in conjunction with the accompanying drawings wherein.

DESCRIPTION OF A PREFERRED EMBODIMENT

The following is a review of the pertinent theory which makes possible the physical implementation of any prescribed electrical transfer function in accordance with the teachings of the present invention.

Figure 1:
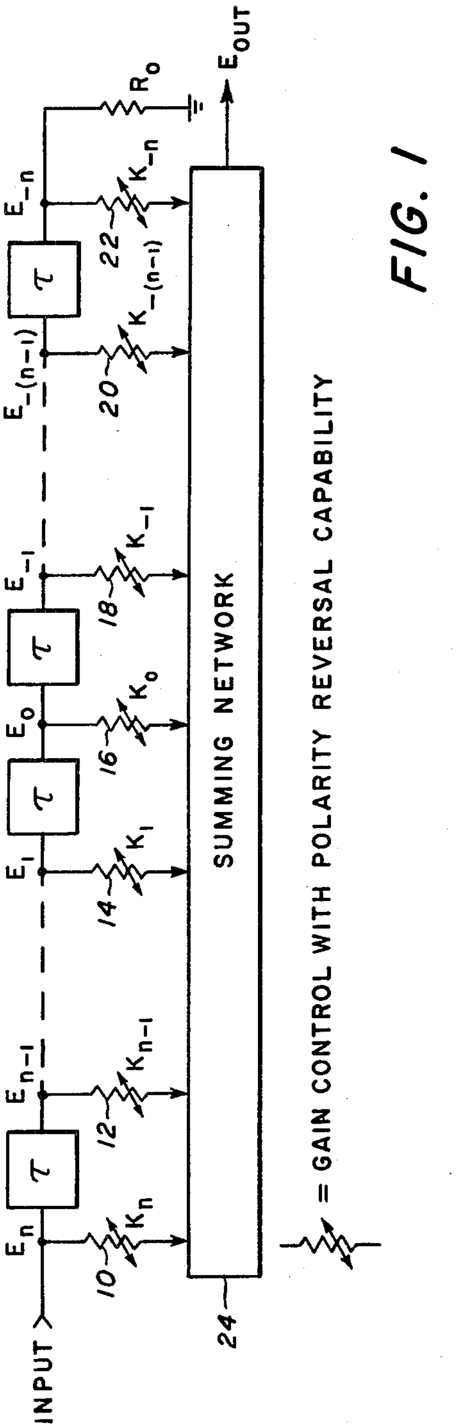
FIG. 1 is a schematic diagram of a tapped delay line configuration.

A typical delay line is shown schematically in FIG. 1. The tap gain controls 10, 12, 14, etc. must be capable of reversing polarity as well as changing amplitude. Tapped delay lines which may be utilized in the present invention are described in Electronic Designers Handbook, Landee et al., McGraw-Hill, Inc., 1957, pp. 20–59 to 20–61. The output of each tap is summed in summing network 24. Mathematical relationships between frequency characteristics and the gain settings of the tapped delay line are presented to provide a rigorous analytical procedure for producing prescribed functions.

The Laplace transform of a pure time delay is $e^{\tau s}$ and likewise $e^{\tau s}$ is the transform of a time advance. Therefore taking $E_o$ in FIG. 1 as the reference input we can write the transfer function as:

$$\frac{E\ \text{out}}{E_o}(S)=H(S)=\sum_{n=-\infty}^{\infty} Kne^{n\tau s}$$

wherein $K_n$ = gain of $n$th tap $n$ = tap number $\tau$ = time delay $S$ = complex frequency substituting $jw$ for $s$, wherein w = angular frequency $$H(jw)=\sum_{n=-\infty}^{\infty} Kne^{jnw\tau}$$

or in trigonometric form $$H(jw)=K_o+\sum_{n=1}^{\infty}(K_{-n}+K_n)\cos nw\tau-$$

$$j\sum_{n=1}^{\infty}(K_{-n}-K_n)\sin nw\tau$$

or $$H(jw)=R(w)-jI(w)$$

where $Rw)$ is the real part of the series and $I(w)$ the imaginary part. Let $m(w)=[R(w)^2+I(w)^2]^{1/2}$ (1) and a. $$\phi(w)=\tan^{-1}\left[\frac{-I(w)}{R(w)}\right] \qquad (2)$$

then $H(jw)=M(w)e^{j\phi(w)}$ and also $R(w)=m(w)\cos\Phi(w)$ (3)

$I(w)=m(w)\sin\Phi(w)$ (4)

$m(w)$ represents the amplitude characteristic and $\Phi(w)$ represents the phase characteristics of the transfer function to be simulated over a range $2\pi$ of the argument ($w\tau$).

If $r(w\ )$ is restricted to even functions defined in the range ($-\pi,\pi$cosine series $$R(w)=K_o+\sum_{n=1}^{\infty}(K_{-n}+K_n)\cos nw\tau \qquad (5)$$

where the $k$'s are defined from Fourier series relationships by $$K_0=\frac{1}{2}\int_0^{\pi} R(w)d(w\tau) \quad (6)$$

$$K_{-n}+K_n=\frac{2}{\pi}\int_0^{\pi} R(w)\cos nw\tau d(w\tau \quad (7)$$

Likewise if $I(w)$ is restricted to odd functions defined in the range $(-\pi,\pi)$ any shape is completely defined by the sine series $$I(w)=\sum_{n=1}^{\infty}(K_{-n}-K_n)\sin nw\tau) \quad (8)$$

where the $k$'s are defined from Fourier series relationships by $$(K_{-n}-K_n)=\frac{2}{\pi}\int_0^{\pi} I(w)\sin nw\tau d(w\tau)$$

The period of the amplitude and phase functions which can be produced is given by $$W_p\tau=2\pi$$

$$W_p=\frac{2\pi}{\tau} \text{ or}$$

$$fp=1/\tau \quad (9)$$

Note that this is a period in the frequency domain, i.e., the "bandwidth" of one period is $fp$ The gain settings K, can now be obtained for particular phase, attenuation, and amplitude characteristics by substituting the desired, or prescribed, functions into equations (3) and (4) and then substituting equations (3) and (4) into equations (6), (7) and (9) or comparing with equations (5) and (8). In the case of amplitude characteristics the result is quite simple. However, phase and attenuation are both functions of frequency which appear as exponents in the exponential form of a transfer function and therefore the results are more complex. Consider first an amplitude function, M($w$). This must be an even function since it is real. Therefore, it can be represented by the cosine series $$M(w)=a_0+\sum_{n=1}^{\infty}a_n\cos nw\tau \quad (10)$$

Let the associated phase function be liner, i.e., distortionless. It can therefore be ignored. Then $$R(w)=M(w)\cos\phi(w)=\left[a_0+\sum_{n=1}^{\infty}a_n\cos nw\tau\right]\cos(o) \quad (11)$$

$$I(w)=M(w)\sin\phi(w)=\left[a_0+\sum_{n=1}^{\infty}a_n\cos nw\tau\right]\sin(o) \quad (12)$$

It is evident that for this case $$R(w)=a_0+\sum_{n=1}^{\infty}a_n\cos nw\tau. \quad (13)$$

By comparison with equations (5) and (8)

$$\left.\begin{array}{l} K_0=a_0 \\ K_{-n}+K_n=a_n \\ K_{-n}-K_n=0, \text{ or} \\ K_{-n}=K_n=a_{n/2} \end{array}\right\} \quad (14)$$

Therefore any amplitude versus frequency characteristic, i.e. M($w$) vs. $w$ can be produced by determining the Fourier cosine series representation of the function, equation (10), and then setting the tap gains according to equations (14). The constants $a_0$ and $a_n$ are found, if M($w$) can be expressed analytically, by solving equations (6) and (7) with M($w$) substituted for R($w$), $a_0$ for $K_0$ and $a_n$ for ($K_{-n}$30$K_n$). This is more or less a simple case and is included for completeness.

Now consider a phase function $\Phi(w)$. The principle interest is in deviations from linear phase, therefore the linear term is ignored. Since phase must be an odd function any phase deviation characteristic can be expressed as $$\phi(w)=\sum_{m=1}^{\infty}bm\sin mw\tau \quad (15)$$

(The running variable $m$ is used instead of $n$ to avoid confusion later). Let the amplitude characteristic be flat, i.e., $m(w)=1$. Then equations (3) and (4) become $$R(w)=\cos\left[\sum_{m=1}^{\infty}bm\sin mw\tau\right] \quad (16)$$

$$I(w)=\sin\left[\sum_{m=1}^{\infty}bm\sin mw\tau\right] \quad (17)$$

These equations are not easily evaluated. However, an alternate approach will yield the desired results. Instead of attempting a direct evaluation of equations (16) and (17), a cascade equivalent of the desired phase function is evaluated. The transfer function described by equation (15) (and flat amplitude) is $$F(jw)=e^{j\phi(w)}=e^{j\sum_{m=1}^{\infty}\text{bm}\sin\text{mw}\tau} \quad (18)$$

This can also be written as $$F(jw)=\prod_{m=1}^{\infty}(e^{j\text{bm}\sin\text{mw}\tau}) \quad (19)$$

or $$F(jw)=\prod_{m=1}^{\infty}Fm(jw) \quad (20)$$

Where $$F_m(jw)=e^{j\text{bm}\sin\text{mw}\tau} \quad (21)$$

Equation (21) describes individual sections which are cascaded to form equation (18) (or 19). Therefore, the phase characteristic of the individual sections is $\Phi m(w)=b_m\sin mw\tau$ (22)

and equations (3) and (4) for each individual section become $R_m(w)=\cos(b_m\sin mw\tau)$ (23)

$I_m(w)=\sin(b_m\sin mw\tau)$ (24)

The gain settings $K_n$, can now be found, for each individual harmonic section by evaluating equations (6), (7), and (9) with equations (23) and (24) substituted. Alternatively, equations (23) and (24) can be expanded as Fourier series with Bessel function coefficients and compared term by term with equations (5) and (8). The results in this latter case are as follows:

$$K_0=J_0(b_m) \quad (25)$$

$$\left.\begin{array}{l} K_{-n}=J_n(b_m) \\ K_n=(-1)^nJ_n(b_m) \end{array}\right\}\text{for all } n=m, 2m, 3m\ldots \quad (26), (27)$$

$$K_{-n}=K_n=0 \text{ For all other } n \quad (28)$$

where $J_n(b)$ is the ordinary Bessel function of the first kind, order $n$, argument $b$. The Bessel function identity $J_n(-b)=(-1)^nJ_n(b)$ (29)

may be used to evaluate equations (25), (26) and (27) when the argument is negative.

The values to the Bessel function are set forth in many standard mathematical and engineering tables and texts, such as in *Time Harmonic Electromagnetic Fields*, R. F. Harrington, McGraw-Hill Co., 1961.

The restriction on the values of $n$ in equations (26), (27) and (28) is equivalent to saying that the delay between active taps is proportional to the order of harmonic being simulated, i.e., if the fundamental is defined by a period, $\tau$ the delay between taps is $\tau$, while the delay between active taps for the second harmonic section is $2\tau$, for the third harmonic $3\tau$, and so on. The constants $b_m$ are evaluated, if $\Phi(w)$ can be expressed analytically, by solving the equation $$b_m=\frac{2}{\pi}\int_0^{\pi}\phi(w)\sin nw\tau dw$$

Figure 2:
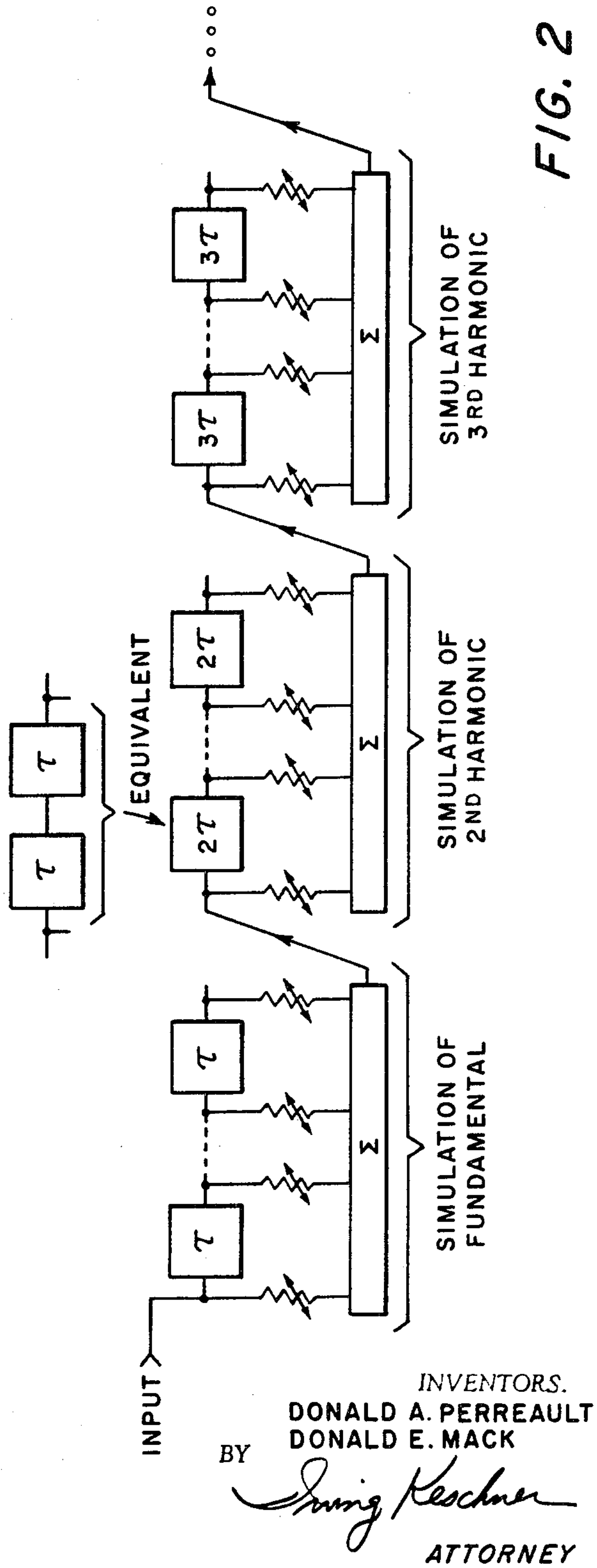
FIG. 2 is a schematic diagram of a tapped delay line arranged to simulate a transfer function by cascading simulations of the harmonics of the transfer function to be simulated.

The complete simulation could be implemented as shown in FIG. 2, i.e., with separate cascaded simulation sections, each with delay between taps corresponding to the order of harmonic being generated. However, reduction to a single uniformly tapped delay line can be accomplished as follows. The overall transfer function of FIG. 2 is $$H(jw)=\prod_{m=0}^{\infty}\left[\sum_{n=-\infty}^{\infty} Kne^{jnwm\tau}\right] \qquad (30)$$

or putting real limits of M harmonics and $N_m$ delay stages per section $$H(jw)=\prod_{m=0}^{M}\left[\sum_{m=-Nm}^{Nm} Kne^{jnwm\tau}\right] \qquad (31)$$

$$=\left(\sum_{n=-N_1}^{N_1} Kne^{jnw\tau}\right)\left(\sum_{n=-N_2}^{N_2} Kne^{jnw2\tau}\right)$$

$$\left(\sum_{n=-N_3}^{N_3} Kne^{jnw3\tau}\right) \qquad (32)$$

The selection of M depends on the number of harmonics desired, i.e., on the basic accuracy desired. The selection of $N_1$, $N_2$, represents a cutoff on the number of delay stages needed to simulate the particular harmonic. Theoretically the number is infinite but a study of Bessel function tables indicates that the value falls off rapidly when the order $n$ exceeds the argument, $b$, by two or three. Equation (32) is therefore a finite product. When the multiplication is carried out exponentials are formed of all orders of $\tau$ from zero up to the sum of the highest positive and highest negative exponents of each factor.

Each different exponential corresponds to a certain delay and the collection of all the coefficients of the same delay represents a composite gain setting for an associated tap. While the multiplication is simple in concept, it is generally quite laborious in practice although a computer may be programmed to carry out the computation. A simple example will help clarify the notation. Suppose a phase function can be adequately represented by a fundamental and 3rd harmonic with 6 stages of delay, $\tau$, for the fundamental and 2 stages of delay, $3\tau$, for the third harmonic (a total delay of $12\tau$). Then $$H(jw)=(K'_{-3}e^{j3w\tau}+K'_{-2}e^{-j2w\tau}+K'_{-1}e^{-jw\tau}K_0+K'_1e^{jw\tau}+K'_2e^{j2w\tau}+K'_3e^{j3w\tau})(K'''_{-3}e^{-jw3\tau}+K'''_0+K'''_3e^{jw3\tau}) \qquad (33)$$

where primes and triple primes are used to identify the gains of the fundamental and third harmonic respectively. Note that the restriction on values of $n$ in equations (26), (27) and (28) has the effect of identifying the amount of delay associated with a given $k$ via its subscript, regardless of how many stages make up the delay. Carrying out the multiplication and collecting terms with exponents yields $$\begin{aligned}H(jw)=&K'_{-3}K'''_{-3}e^{-j6w\tau}+K'_{-2}K'''_{-3}e^{j5w\tau}+K'_{-1}K'''_{-3}e^{-j4w\tau}\\&+(K'_0K'''_{-3}+K'_{-3}K'''_0)e^{j3w\tau}+(K'_1K'''_{-3}+K'_{-2}K'''_0)e^{j2w\tau}\\&+(K'_2K'''_{-3}+K'_{-1}K'''_0)e^{-jw\tau}+(K'_3K'''_{-3}+K'_0K'''_0+K'_{-3}K'''_3)\\&+(K'_1K'''_0+K'_{-2}K'''_3)e^{jw\tau}+(K'_2K'''_0+K'_{-1}K'''_3)e^{j2w\tau}\\&+(K'_3K'''_0+K'_0K'''_3)e^{j3w\tau}+K'_1K'''_3e^{j4w\tau}+K'_2K'''_3e^{j5w\tau}\\&+K'_3K'''_3e^{j6w\tau}\end{aligned} \qquad (34)$$

This result indicates that the composite characteristics can be implemented with a tapped delay line with 12 stages of delay $\tau$, uniformly tapped.

The composite gain settings are given by:

$$K_{-6}=K'_{-3}K'''_{-3};\ K_{-5}=K'_{-2}K'''_{-3}$$
$$K_{-4}=K'_{-1}K'''_{-3};\ K_{-3}=K'_0K'''_{-3}$$
$$K_{-2}=K'_1K'''_{-3}+K'_{-2}K'''_0;\ K_{-1}=K'_2K'''_{-3}+K'_{-1}K'''_0$$
$$K_0=K'_3K'''_{-3}+K'_0K'''_0+K'_{-3}K'''_3$$
$$K_1=K'_1K'''_0+K'_{-2}K'''_3;\ K_2=K'_2K'''_0+K'_{-1}K'''_3$$
$$K_3=K'_3K'''_0+K'_0K'''_3;\ K_4=K'_1K'''_3$$
$$K_5=K'_2K'''_3;\ K_6=K'_3K'''_3$$

Note that with the notation selected the subscripts add up to the delay associated with the particular gain setting. The total amount of delay required is theoretically the same as required for separate simulation of the harmonics. However, in practice gain settings of any particular harmonic decrease in value away from the center tap due to the nature of the Bessel functions. The outer composite gain settings are therefore products of small quantities and are thus very small and can often be ignored. In effect the calculation of composite settings sharpens the contrast between significant and insignificant gain settings over what is observed for the individual harmonics. As a practical result, the actual total amount of delay used can be more confidently reduced in the composite configuration. For example, it may be doubtful whether or not $k_3'$ could be discarded in the previous example whereas the composite $K_6=K_3'K_3'''$ may be more obviously insignificant.

Thus far simulation of amplitude and phase characteristics have been discussed. Simulation of attenuation is also possible. Attenuation and amplitude are of course logarithmically related. It is often more convenient to deal with attenuation since it is additive and also because its parameters are more directly related to phenomena in the time domain. In simulating attenuation two choices are available. The attenuation characteristic can be converted to an amplitude characteristic and then simulated as discussed previously. Alternatively, the attenuation characteristic may be simulated directly in a manner similar to phase. Consider an attenuation function, $A(w)$, which must be an even function since it is real. Therefore it can be represented by the cosine series $$A(w)=a_o+\sum_{m=1}^{\infty} Am\cos mw\tau \qquad (36)$$

If the coefficients of (36) are expressed in nepers, the attenuation in nepers being defined as the Napierian logarithm ($ln$) of the amplitude function $M(w)$, then the corresponding amplitude function is $$M(w)=e^{a}o+\sum_{m=1}^{\infty} Am\cos mw\tau \qquad (37)$$

Neglecting the constant term which does not cause distortion and also neglecting an assumed linear phase, equations (3) and (4) become $$R(w)=e^{\sum_{m=1}^{\infty} Am\cos mw\tau} \qquad (38)$$

$$I(w)=o \qquad (39)$$

Equation (38) is difficult to evaluate. However, proceeding term by term and then multiplying the results effects a solution as in the phase case as set forth hereinabove. Each individual harmonic is of the form $$R_m(w)=e^{Am\cos mw\tau} \qquad (40)$$

$$I_m(w)=o \qquad (41)$$

A modified Bessel function identify expresses equation (40) as a cosine series which may be compared term by term with equation (5). Utilizing also equations (8) and (41) to obtain a solution yields $K_o=I_o(a_m)$ (42)

$K_n=K_{-n}=I_n(a_m)$ for all $n=m, 2m, 3m, \ldots$ (43)

$K_n=K_{-n}=0$ for all other n where $I_n(a)$ is the modified Bessel function, described in the Harrington reference set forth above, of the first kind, order $n$, argument $a$. The identity $I_n(-a)=(-1)^nI_n(a)$ may be used to evaluate equation (42) and 43) for negative arguments. With proper attention to notation the composite gain settings for the desired attenuation function can be obtained by multiplying the transfer functions of the individual harmonics and collecting the coefficients of all terms with like delays, as illustrated above for phase case.

Combinations of phase and amplitude (attenuation) can be simulated by calculating each simulation separately and then multiplying the results together to obtain the composite gain settings. This is equivalent to considering the overall function as a phase characteristic with unity amplitude in series with an amplitude characteristic with linear phase.

Figure 3:
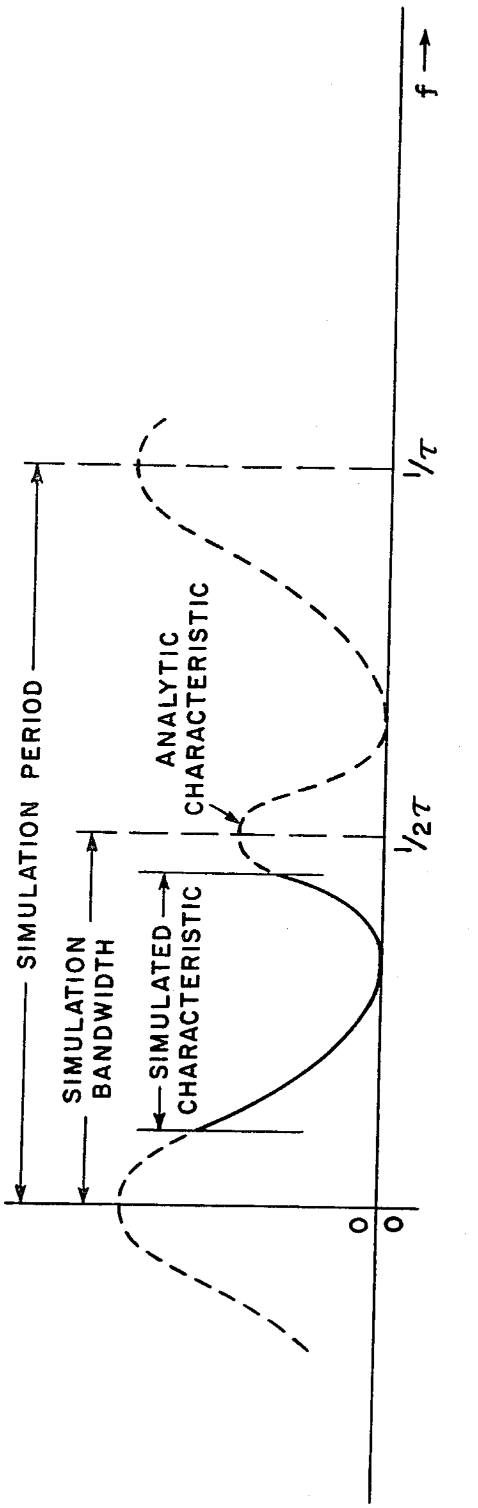
FIGS. 3 and 4 are waveforms illustrating a simulated output.

The theory set forth hereinabove has been implemented to construct an actual simulator. The major decision in building a simulator is selection of the basic delay, $\tau$. Two considerations are involved. First, phase characteristics must be odd in the period $f=1/\tau$, or equivalently envelope delay (the first derivative of phase with respect to frequency) must be even. Amplitude or attenuation characteristics must also be even in the period $f=1/\tau$. This means that if it is desired to simulate any given shape with a given bandwidth it is necessary to make the simulation period twice as wide so that the function can be made over the wider bandwidth. Generally, it is convenient to make the period a little wider in order to avoid shapes requiring many harmonics to approximate. This is shown in FIG. 3 which shows how the additional bandwidth allows a conveniently smooth extrapolation of the desired characteristic. For example, in designing for simulation in a bandwidth of about 300 to 3,000 cycles per second, it has been found convenient to use $\tau=139$ microseconds or $1/\tau=7{,}200$ c.p.s. The characteristics simulated are mirror images about 3,600 c.p.s. Of course if it is desired to simulate only characteristics which are symmetrical about the center of their own bandwidth then generally only about half of the simulation period is required.

Figure 4:
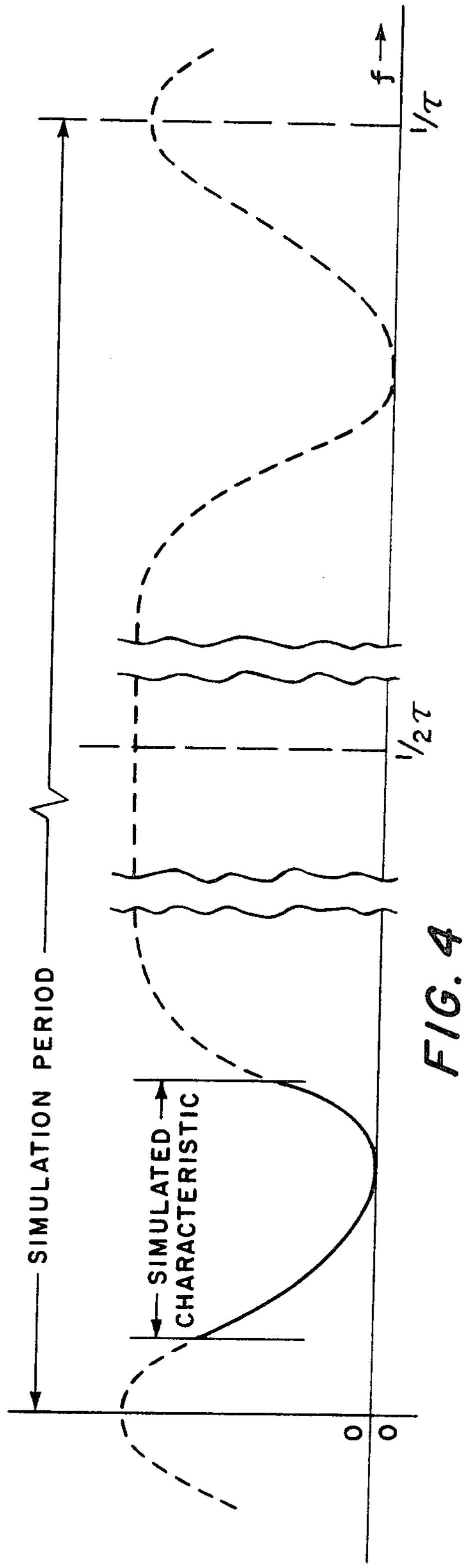

Another consideration in choosing $\tau$ is the fact that the characteristics repeat with period $f=1/\tau$ along the frequency axis. This is a basic characteristic of tapped delay lines. It is generally not troublesome since the signal is usually band-limited in nature or can be made so by filtering. However, the period can be made as large as desired by choosing $\tau$ appropriately small. The desired characteristic is then made very asymmetric, i.e., having the desired shape within the desired band, but constant (or other shape which can be ignored) over the remainder of the simulation period. FIG. 4 shows an example. This procedure would generally result in many more taps and thus more circuitry and more complexity of adjustment.

The delay can be implemented in any manner which produces constant delay across the desired band. It is not necessary that the delay be constant over the entire period $f=1/\tau$. A number of techniques are well known for producing constant delay over a limited bandwidth. For example, constant delay can be obtained from a number of active and passive circuits which implement the transfer function $$G(s)=K\frac{\left[\frac{s^2}{w_o^2}-\frac{\epsilon}{w_o}s+1\right]}{\left[\frac{s^2}{w_o^2}+\frac{\epsilon}{w_o}s+1\right]}$$

Figure 5A:
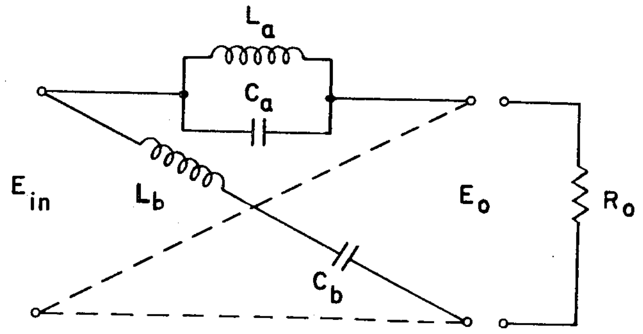
FIG. 5*a* and FIG. 5*b* are schematic diagrams of allpass networks for producing constant delay over a limited bandwidth.

$s$= complex frequency
$w_o$= natural resonant frequency
$\epsilon$=267 , 67 =damping factor
$K$=gain (or loss) constant In this class is the allpass lattice network shown in FIG. 5*a*, for which $K=1$, with a time delay characteristic $$\tau(w)=\frac{2}{w}\tan^{-1}\frac{\epsilon n}{1-n^2}$$

$$n=\frac{w}{w_o}$$

Figure 5B:
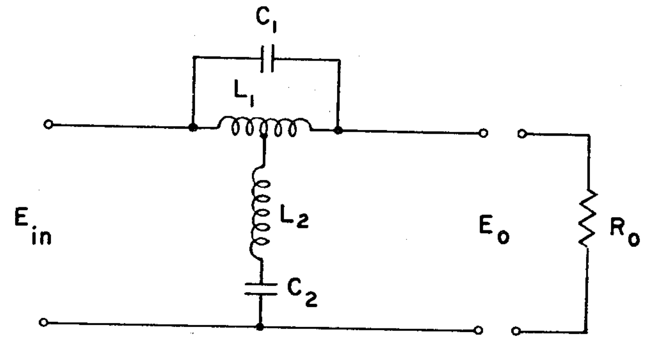

The time delay is substantially flat, and equal to $\frac{1}{2}f_o$ across the band 0 to $f_o$ c.p.s. When $\epsilon=\pi/2$, FIG. 5*b* illustrates a Bridged-T equivalent of the lattice network of FIG. 5*a*.

Figure 6:
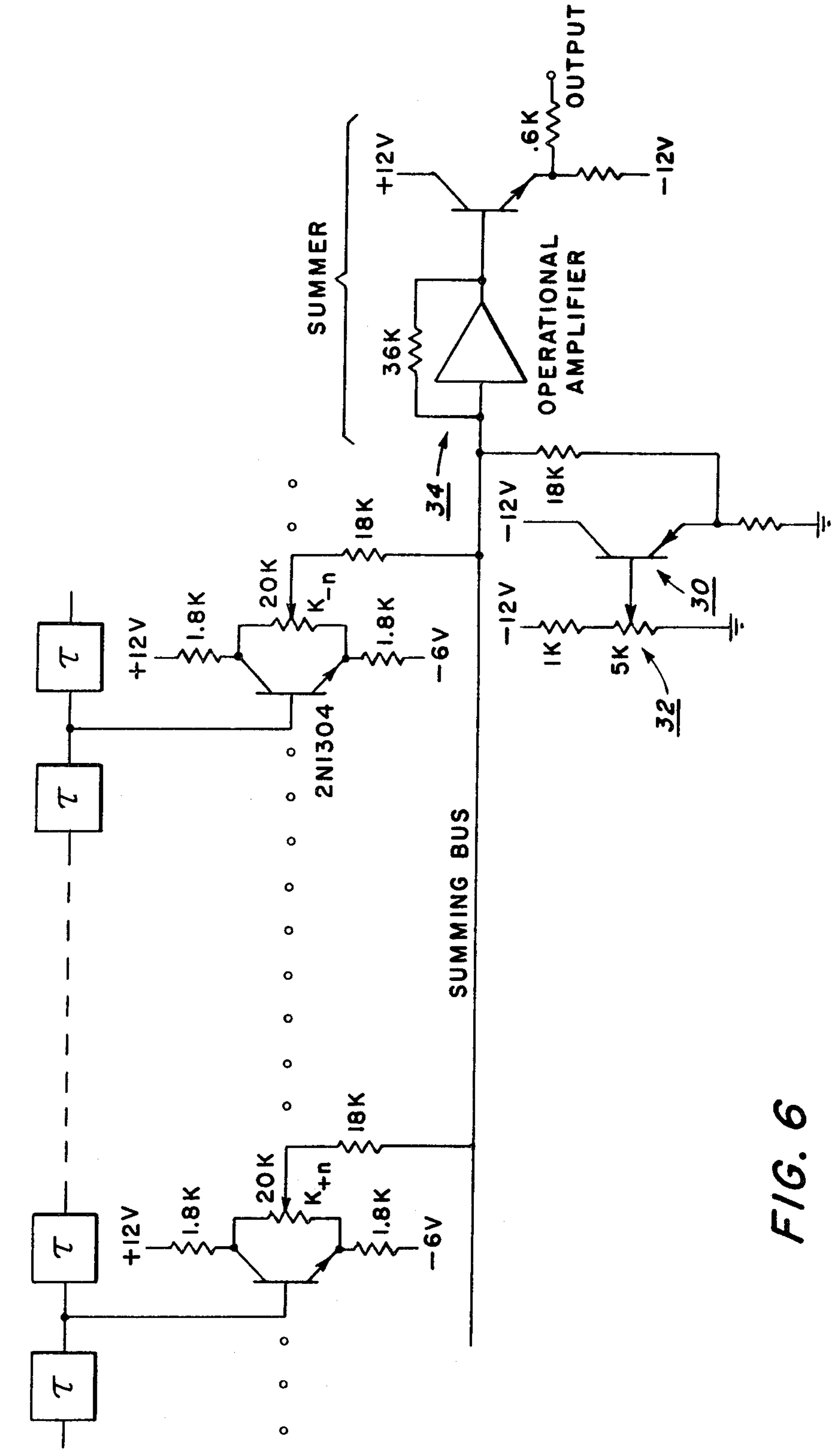
FIG. 6 is a schematic diagram of the tapped delay configuration utilized in accordance with the teachings of the present invention.

The basic requirements of the taps are that they not disturb the impedance match of the delay line (otherwise reflections will occur), and that the taps have the capability for polarity inversion as well as amplitude adjustment. A suitable circuit arrangement is shown in FIG. 6. In some case the summation can precede the polarity inversion. Summation must of course be accomplished in a manner which avoids interaction between the various adjustments.

The number of delay stages required depends on the amplitude of the functions to be simulated (i.e., the argument of the Bessel functions in the phase case), the number of harmonics involved, and the accuracy with which each harmonic is to be simulated.

The number of harmonics required is an engineering judgment based on the purpose of the simulation. Accuracy of simulation is also a matter of judgment but in any case it will be found that the higher order gain adjustments drop off in significance to the point where they no longer can be measured or set conveniently. This point can be estimated by observing the values of Bessel functions, which generally drop off rapidly after the order exceeds the argument by a certain amount, usually two or three. For a given class of characteristics a few trial simulations will be sufficient to arrive at a good compromise figure for the number of stages. For this purpose it is desirable to be able to calculate the actual transfer function produced by a uniformly tapped delay line with a finite number of taps and actual gain settings. The necessary equations are (1) and (2) with equations (5) and (8) substituted and evaluated with the actual values and actual number of gain adjustments. The results are:

$$M(w)=\left\{\left[Ko+\sum_{n=1}^{N}(K_{-n}+K_n)\cos nw\tau\right]^2+\left[\sum_{n=1}^{N}\left(K_{-n}-K_n\right)\sin nw\tau\right]^2\right\}^{\frac{1}{2}}$$

$$\frac{d\phi}{dw}=\frac{\left[-\frac{\sum_{n=1}^{N}(K_{-n}+K_n)n\tau\sin nw\tau}{K_o+\sum_{n=1}^{N}(K_{-n}+K_n)\cos nw\tau}\right]-\left[\frac{\sum_{n=1}^{N}(K_{-n}-K_n)n\tau\cos nw\tau}{\sum_{n=1}^{N}(K_{-n}-K_n)\sin nw\tau}\right]}{\left[\frac{K_o+\sum_{n=1}^{N}(K_{-n}+K_n)\cos nw\tau}{\sum_{n=1}^{N}K_{-n}-K_n)\sin nw\tau}\right]+\left[\frac{\sum_{n=1}^{N}(K_{-n}-K_n)\sin nw\tau}{K_o+\sum_{n=1}^{N}(K_{-n}+K_n)\cos nw\tau}\right]} \quad (49)$$

Envelope delay is given (e.g. 49) instead of phase since envelope delay is usually of more practical interest. The effect of truncating the delay line in a practical envelope delay simulation is to deviate from the desired envelope delay characteristic and also to introduce amplitude variations. The effect of truncating the delay line in a practical amplitude attenuation simulation is to deviate from the desired characteristic. However, no unwanted envelope delay is introduced.

A tapped delay line has been constructed with 23 stages of delay and $\tau=139$ microseconds giving a simulation period of 7,200 c.p.s. and a useful simulation bandwidth of 3,600 c.p.s. (from 0 to 3,600 c.p.s.) The characteristic impedance of the networks is 600 ohms. The tap gain adjustments may be provided by the circuit shown in FIG. 6, the value of the components and type of transistors utilized being as shown. Other techniques known to those skilled in the art may be employed to provide the taps, the tap gain controls and the summation function shown in FIG. 6. The tap transistor stage has a high-input impedance (as compared to 600 ohms) so as not to affect the operation of the delay line. The circuit has a gain of unity with provisions for an inphase or out-of-phase output. Either polarity output may be obtained depending on the relative position to the center of the potentiometer. The extra transistor circuit 30 and potentiometer 32 are necessary to balance the input to the operational amplifier 34 at ground. The circuitry is arranged to give an output impedance of 600 ohms and unity gain.

A computer program may be utilized to calculate the harmonics of an arbitrary characteristic, calculate the curve represented by a limited number of harmonics, look up the Bessel functions corresponding to the gain settings for the individual harmonics, compute the composite gain settings (equivalent to multiplying the transfer functions of the individual harmonics), and calculate the characteristic represented by the calculated gain settings.

The following summarized some of the features of the tapped delay line simulation and will further illustrate what is believed to be the unique capability for simulation of transfer functions. It should be noted that the coefficients of the Fourier series, i.e., $a_o$, $a_n$, $b_m$, may be found analytically, if the desired function can be expressed analytically, or may be found by numerical procedures if the desired function is expressed empirically. The coefficients are found analytically by utilizing the Fourier equation and empirically by plotting the desired function to be simulated and ascertaining the coefficients directly by graphical analysis.

The general procedure for simulating the transfer function of any system is set forth hereinbelow:

A. Simulation of phase/envelope delay starting with a phase function:

1. Extrapolate the phase function as an odd repeating function
2. Obtain the coefficients of the equivalent Fourier sine series by either numerical or analytical techniques, whichever is appropriate,
3. Find the tap settings for each harmonic via the Bessel functions by the technique set forth hereinabove,
4. Multiply the transfer functions representing each harmonic to find the composite tap gain settings by grouping coefficients of terms of like delay,
5. Set the tap gains in accordance with the results obtained in step (4), and
6. Sum the tap gain outputs.

The simulation of a phase characteristic, if the envelope delay characteristic is known, may be accomplished in the following manner. Since real phase must be an odd function, real envelope delay must be an even function represented by a cosine series. The coefficients of the Fourier cosine series of the envelope delay characteristic are obtained and converted to the coefficients of the Fourier sine series representing phase by integrating term by term. For example, if the Fourier series coefficients of phase, $$F(\phi)=\sum b_n \sin n w \tau$$

then $$\frac{d}{dw}(F(\phi))=\sum n\tau \cos n w\tau=\sum B_n \cos n w \tau$$

which equals the Fourier series coefficients of envelope delay. Then $$b_n=\frac{B_n}{n\tau}$$

B. Simulation of phase/envelope delay starting with an envelope delay function:

1. Extrapolate the envelope delay function as an even repeating function,
2. Obtain the coefficients of the equivalent Fourier cosine series by either numerical or analytical techniques, whichever is appropriate,
3. Convert these coefficients to coefficients of the related phase Fourier sine series, term by term, as set forth hereinabove,
4. Find the tap settings for each harmonic via the Bessel function by the techniques set forth hereinabove,
5. Multiply the transfer functions representing each harmonic to find the composite tap gain settings by grouping coefficients of terms of like delay,
6. Set the tap gains in accordance with the results obtained in step (4), and
7. Sum the tap gain outputs.

C. Simulation of amplitude/attenuation starting with an amplitude function:

1. Extrapolate the amplitude function as an even repeating function,
2. Obtain the coefficients of the equivalent Fourier cosine series by either numerical or analytical techniques, whichever is appropriate,
3. Set the tap gains in accordance with the results obtained in step (2), and
4. Sum the tap gain outputs.

D. Simulation of amplitude/attenuation starting with an attenuation function:

1. Extrapolate the attenuation function as an even repeating function,
2. Obtain the coefficients of the equivalent Fourier cosine series by numerical or analytical techniques, whichever is appropriate,
3. Find the tap gain settings for each harmonic via the modified Bessel functions as set forth hereinabove,
4. Multiply the transfer functions representing each harmonic to find the composite tap gain settings by grouping coefficients of terms of like delay,
5. Set the tap gains in accordance with the results obtained in step (4), and
6. Sum the tap gain outputs.

E. Simulation of combined phase/envelope delay and amplitude/attenuation.

1. Obtain tap settings for simulation of phase/envelope delay as in A or B above,
2. Obtain tap settings for simulation of amplitude/attenuation as in C or D above,
3. Multiply the two delay line transfer functions represented by the tap gain settings of (1) and (2) above to find composite gain settings by grouping coefficients of terms of like delay,
4. Set the tap gains in accordance with the results obtained in step (3), and
5. Sum the tap gain outputs.

The following example illustrates the simulation of phase/envelope delay starting with an envelope delay function in the voice frequency band utilizing the particular delay line described hereinabove:

The procedure is as follows:

1. Plot the envelope delay function over the band of interest.
2. Extrapolate the characteristic to cover the band from 0 to 3,600 c.p.s. (A smooth extrapolation, i.e., zero slope at 0 and 3,600 c.p.s. will be more accurately simulated with a limited number of harmonics).
3. Measure ordinates of the characteristic from 0 to 3,600 c.p.s. at 100 c.p.s. intervals.
4. Using the data from step 3 obtain a harmonic analysis of the envelope delay function.
5. Obtain an approximation of the envelope delay function using a finite number of harmonics, and decide if the approximation is suitable. For most simulations attempted five harmonics were adequate.
6. Obtain the composite gain settings for the tapped delay line by utilizing equations (25)–(28), (32) and the Bessel functions as found in standard mathematical texts. The Bessel function argument, $b_m$, represents the amplitude of the phase harmonic in radians. This is obtained from he amplitude, $b_m m\tau$ of the corresponding envelope delay harmonic, in seconds; where $m$ is the order of harmonic and $\tau$ is the reciprocal of the fundamental period of the simulator, fixed at 139 microseconds in the present simulator. Thus, the phase junction simulation coefficients can be obtained from the envelope delay characteristic. Steps (7), (8) and (9) which follow are utilized to check the computed simulator settings of step (6) with the actual transfer function produced by the tapped delay line.
7. Obtain the characteristic which corresponds to the gain settings obtained in step 6. (evaluate equation 49).

8. Adjust the simulator using all gain settings out to the limit of convenient measurability. Settings may be normalized with respect to the largest, usually $K_o$.
9. If desired, measure the characteristic produced by the tapped delay line.

If it becomes necessary to discard significant gain settings because of the physical limitations of the hardware, it may be desirable to calculate the characteristic corresponding to the truncated set of gain settings by repeating step (7). In this case, it might also be desirable to calculate equation (48) to provide assurance that the amplitude characteristic is not compromised too much.

The procedure for simulating the transfer function of any system as set forth hereinabove, and in particular, a transmission line, provides a simple, reliable and economical method for analyzing the effects on electrical signals transmitted through the actual system.

What is claimed is:

1. A method for simulating the phase frequency characteristic of an electrical network comprising the steps of:

a. providing a tapped delay line having an input and center tap, said input tap receiving an input signal, said tapped delay line having a first set of sections each of delay $\tau$ disposed on one side of said center tap and a second set of sections of delay $\tau$, equal in number to said first set of sections, disposed on the other side of said center tap, each of said first and second sets of sections having an input and output, b. providing a first and second set of variable gain devices, each one of said first set of variable gain devices having an associated section from said first set of sections and being connected to the output thereof, each one of said second set of variable gain devices having an associated section from said second set of sections and connected to said output thereof, the gain setting of each one of said variable gain devices being calculated in manner enabling said characteristic to be simulated, said gain settings being calculated by;

1. extrapolating the desired phase characteristic as an odd repeating function over a desired frequency bandwidth,
2. obtaining the coefficients of each harmonic of the Fourier sine series of said phase characteristic,
3. utilizing the coefficients obtained in step (2) to obtain intermediate results which represent the gains which would be associated with taps of a multisection tapped delay line each section of which, if so adjusted, would represent the transfer function of one harmonic of said phase characteristic,
4. multiplying the transfer functions representing each harmonic expressed in terms of the intermediate result obtained in step (3) to find composite tap gain settings which when applied to the taps of a uniformly tapped delay line represents the settings necessary to produce a transfer function which is the multiplicative composite of the transfer functions of the individual harmonics of said phase characteristic,
5. adjusting the gain settings of said variable gain devices connected to the output taps of said uniformly tapped delay line to the value determined in step (4), and c. summing the outputs of the adjusted variable gain devices whereby the ratio of the summed output to said input signal corresponds to said phase versus frequency characteristic.

2. A method for simulating the attenuation versus frequency characteristic of an electrical network comprising the steps of:

a. providing a tapped delay line having an input and center tap, said input tap receiving an input signal, said tapped delay line having a first set of sections each of delay $\tau$ disposed on one side of said center tap and a second set of sections of delay $\tau$, equal in number to said first set of sections, disposed on the other side of said center tap, each of said first and second sets of sections having an input and output, b. providing a first and second set of variable gain devices, each one of said first set of variable gain devices having an associated section from said first set of sections and being connected to the output thereof, each one of said second set of variable gain devices having an associated section from said second set of sections and connected to said output thereof, the gain setting of each one of said variable gain devices being calculated in manner enabling said characteristic to be simulated, said gain settings being calculated by;

1. extrapolating the desired attenuation characteristic as an even repeating function over a desired frequency bandwidth,
2. obtaining the coefficients of each harmonic of the Fourier cosine series of said attenuation characteristic,
3. utilizing the coefficients obtained in step (2) to obtain intermediate results which represent the gains which would be associated with taps of a multisection tapped delay line each section of which, if so adjusted, would represent the transfer function of one harmonic of said attenuation characteristic,
4. multiplying the transfer functions representing each harmonic expressed in terms of the intermediate results obtained in step (3) to find composite tap gain settings which when applied to the taps of a uniformly tapped delay line represents the settings necessary to produce a transfer function which is the multiplicative composite of the transfer functions of the individual harmonics of said attenuation characteristic,
5. adjusting the gain settings of said variable gain devices connected to the output taps of said uniformly tapped delay line to the value determined in step (4), and c. summing the outputs of the adjusted variable gain devices whereby the ratio of the summed output to said input signal corresponds to said attenuation versus frequency characteristic.

3. A method for simulating the amplitude versus frequency characteristic of an electrical network comprising the steps of:

a. providing a tapped delay line having an input and center tap, said input tap receiving an input signal, said tapped delay line having a first set of sections each of delay $\tau$ disposed on one side of said center tap and a second set of sections of delay $\tau$, equal in number to said first set of sections, disposed on the other side of said center tap, each of said first and second sets of sections having an input and output, b. providing a first and second set of variable gain devices, each one of said first set of variable gain devices having an associated section from said first set of sections and being connected to the output thereof, each one of said second set of variable gain devices having an associated section from said second set of sections and connected to said output thereof, the gain setting of each one of said variable gain devices being calculated in manner enabling said characteristic to be simulated, said gain settings being calculated by;

1. extrapolating the desired amplitude characteristic as an even repeating function over a desired frequency bandwidth,
2. obtaining the coefficients of each harmonic of the Fourier cosine series of said amplitude characteristic,
3. utilizing the coefficients obtained in step (2) to obtain the gain settings of variable gain devices connected to the output taps of a uniformly tapped delay line,
4. adjusting the gain settings of said variable gain devices connected to the output taps of said uniformly tapped delay line to the values determined in step (2), and c. summing the outputs of the adjusted variable gain devices whereby the ratio of the summed output to said input signal corresponds to said phase versus frequency characteristic.

4. A method for simulating the phase versus frequency characteristic of an electrical network starting with the envelope delay frequency characteristic thereof comprising the steps of:

a. providing a tapped delay line having an input and center tap, said input tap receiving an input signal, said tapped delay line having a first set of sections each of delay $\tau$ disposed on one side of said center tap and a second set of sections of delay $\tau$, equal in number to said first set of sections, disposed on the other side of said center tap, each of said first and second sets of sections having an input and output, b. providing a first and second set of variable gain devices, each one of said first set of variable gain devices having an associated section from said first set of sections and being connected to the output thereof, each one of said second set of variable gain devices having an associated section from said second set of sections and connected to said output thereof, the gain setting of each one of said variable gain devices being calculated in manner enabling said characteristic to be simulated, said gain settings being calculated by;

1. extrapolating the envelope delay characteristic as an even repeating function over a desired frequency bandwidth,
2. obtaining the coefficients of each harmonic of the Fourier cosine series of said envelope delay characteristic,
3. converting the coefficients obtained in step (2) to coefficients of the related phase Fourier sine series term by term,
4. utilizing the coefficients obtained in step (3) to obtain intermediate results which represent the gains which would be associated with taps of multisection tapped delay line each section of which, if so adjusted, would represent the transfer function of one harmonic of said phase characteristic,
5. multiplying the transfer functions representing each harmonic expressed in terms of the intermediate results obtained in step (4) to find composite tap gain settings which when applied to the taps of a uniformly tapped delay line represents the settings necessary to produce a transfer function which is the multiplicative composite of the transfer functions of the individual harmonics of said phase characteristic,
6. adjusting the gain settings of said variable gain devices connected to the output taps of said uniformly tapped delay line to the values determined in step (5), and c. summing the outputs of the adjusted variable gain devices whereby the ratio of the summed output to said input signal corresponds to said phase versus frequency characteristic.

5. A method for simulating the phase and amplitude frequency characteristic of an electrical network comprising the steps of:

a. providing a tapped delay line having an input and center tap, said input tap receiving an input signal, said tapped delay line having a first set of sections each of delay $\tau$ disposed on one side of said center tap and a second set of sections of delay $\tau$, equal in number to said first set of sections, disposed on the other side of said center tap, each of said first and second sets of sections having an input and output, b. providing a first and second set of variable gain devices, each one of said first set of variable gain devices having an associated section from said first set of sections and being connected to the output thereof, each one of said second set of variable gain devices having an associated section from said second set of sections and connected to said output thereof, the gain setting of each one of said variable gain devices being calculated in manner enabling said characteristic to be simulated, said gain settings being calculated by;

1. extrapolating the desired phase and amplitude characteristic as an odd and even function, respectively, over a desired frequency bandwidth,
2. obtaining the coefficients of each harmonic of the Fourier sine series of said phase characteristic, and the Fourier cosine series of said amplitude characteristic, respectively,
3. utilizing the coefficients obtained in step (2) to obtain intermediate results which would represent the gains which would be associated with taps of a multisection tapped delay line each section of which, if so adjusted, would represent the transfer function of one harmonic of said phase characteristic and the gains associated with a uniformly tapped delay line each section of which, if so adjusted, would represent the transfer function of one harmonic of said amplitude characteristic,
4. multiplying the transfer functions representing each harmonic expressed in terms of the intermediate results obtained in step 3) to find composite tap gain settings which when applied to the taps of a uniformly tapped delay line represents the settings necessary to produce a transfer function which is the multiplicative composite of the transfer functions of the individual harmonics of said phase and amplitude characteristics,
5. adjusting the gain settings of said variable gain devices connected to the output taps of said uniformly tapped delay line to the values determined in step (4), and c. summing the outputs of the adjusted variable gain devices whereby the ratio of the summed output to said input signal corresponds to said phase and amplitude frequency characteristic.

6. A method for simulating the phase and attenuation frequency characteristic of an electrical network comprising the steps of:

a. providing a tapped delay line having an input and center tap, said input tap receiving an input signal, said tapped delay line having a first set of sections each of delay $\tau$ disposed on one side of said center tap and a second set of sections of delay $\tau$, equal in number to said first set of sections, disposed on the other side of said center tap, each of said first and second sets of sections having an input and output, b. providing a first and second set of variable gain devices, each one of said first set of variable gain devices having an associated section from said first set of sections and being connected to the output thereof, each one of said second set of variable gain devices having an associated section from said second set of sections and connected to said output thereof, the gain setting of each one of said variable gain devices being calculated in manner enabling said characteristic to be simulated, said gain settings being calculated by;

1. extrapolating the desired phase and attenuation characteristic as an odd and even repeating function, respectively, over a desired frequency bandwidth,
2. obtaining the coefficients of each harmonic of the Fourier sine series of said phase characteristics and the Fourier cosine series of said attenuation characteristic, respectively,
3. utilizing the coefficients obtained in step (2) to obtain intermediate results which would represent the gains which would be associated with taps of a multisection tapped delay line each section of which, if so adjusted, would represent the transfer function of one harmonic of said phase characteristic and the gains associated with a multisection tapped delay line each section of which, if so adjusted, would represent the transfer function of one harmonic of said amplitude characteristic,
4. multiplying the transfer functions representing each harmonic expressed in terms of the intermediate results obtained in step (3) to find composite tap gain settings which when applied to the taps of a uniformly tapped delay line represents the settings necessary to produce a transfer function which is the multiplicative composite of the transfer functions of the individual harmonics of said phase and attenuation characteristic,
5. adjusting the gain settings of said variable gain devices connected to the output taps of said uniformly tapped delay line to the values determined in step (4), and c. summing the outputs of the adjusted variable gain devices whereby the ratio of the summed output to said input signal corresponds to said phase and attenuation frequency characteristic.

7. A method for simulating the phase, starting with the envelope delay frequency characteristic, and amplitude frequency characteristic of an electrical network comprising the steps of:

a. providing a tapped delay line having an input and center tap, said input tap receiving an input signal, said tapped delay line having a first set of sections each of delay $\tau$ disposed on one side of said center tap and a second set of sections of delay $\tau$, equal in number to said first set of sections, disposed on the other side of said center tap, each of said first and second sets of sections having an input and output, b. providing a first and second set of variable gain devices, each one of said first set of variable gain devices having an associated section from said first set of sections and being connected to the output thereof, each one of said second set of variable gain devices having an associated section from said second set of sections and connected to said output thereof, the gain setting of each one of said variable gain devices being calculated in a manner enabling said characteristic to be simulated, said gain settings being calculated by, 1. extrapolating the envelope delay and amplitude characteristic as even repeating functions over a desired frequency bandwidth,
2. obtaining the coefficients of each harmonic of the Fourier cosine series of said envelope delay characteristic and the Fourier cosine series of said amplitude characteristic, respectively,
3. converting the envelope delay coefficients obtained in step (2) to coefficients of the related phase Fourier sine series term by term,
4. utilizing the coefficients obtained in step (3) to obtain intermediate results which would represent the gains which would be associated with taps of a multisection tapped delay line each section of which, if so adjusted, would represent the transfer function of one harmonic of said phase characteristic and the gains associated with a uniformly tapped delay line each section of which, if so adjusted, would represent the transfer function of one harmonic of said amplitude characteristic,
5. multiplying the transfer functions representing each harmonic expressed in terms of the intermediate results obtained in step (4) to find composite tap gain settings which when applied to the taps of a uniformly tapped delay line represents the settings necessary to produce a transfer function which is the multiplicative composite of the transfer functions of the individual harmonics of said phase and amplitude characteristic,
6. adjusting the gain settings of said variable gain devices connected to the output taps of said uniformly tapped delay line to the values determined in step (5), and c. summing the outputs of the adjusted variable gain devices whereby the ratio of the summed output to said input signal corresponds to said phase and amplitude frequency characteristic.

8. A method for simulating the phase, starting with the envelope delay frequency characteristic, and attenuation frequency characteristic of an electrical network comprising the steps of: a. providing a tapped delay line having an input and center tap, said input tap receiving an input signal, said tapped delay line having a first set of sections each of delay $\tau$ disposed on one side of said center tap and a second set of sections of delay $\tau$, equal in number to said first set of sections, disposed on the other side of said center tap, each of said first and second sets of sections having an input and output, b. providing a first and second set of variable gain devices, each one of said first set of variable gain devices having an associated section from said first set of sections and being connected to the output thereof, each one of said second set of variable gain devices having an associated section from said second set of sections and connected to said output thereof, the gain setting of each one of said variable gain devices being calculated in a manner enabling said characteristic to be simulated, said gain settins being calculated by:

1. extrapolating the envelope delay and frequency characteristic as odd repeating functions over a desired frequency bandwidth,
2. obtaining the coefficients of each harmonic of the Fourier cosine series of said envelope delay characteristic and the Fourier cosine series of said attenuation characteristic, respectively,
3. converting the envelope delay coefficients obtained in step (2) to coefficients of the related phase Fourier sine series term by term,
4. utilizing the coefficients obtained in step (3) to obtain intermediate results which would represent the gains which would be associated with taps of a multisection tapped delay line each section of which, if so adjusted, would represent the transfer function of one harmonic of said phase characteristic and the gains associated with a multisection tapped delay line each section of which, if so adjusted, would represent the transfer function of one harmonic of said attenuation characteristic,
5. multiplying the transfer functions representing each harmonic expressed in terms of the intermediate results obtained in step (4) to find composite tap gain settings which when applied to the taps of a uniformly tapped delay line represents the settings necessary to produce a transfer function which is the multiplicative composite of the transfer functions of the individual harmonics of said phase and attenuation characteristic,
6. adjusting the gain settings of said variable gain devices connected to the output taps of said uniformly tapped delay line to the values determined in step (5), and c. summing the outputs of the adjusted variable gain devices whereby the ratio of the summed output to said input signal corresponds to said phase and attenuation frequency characteristic.

* * * * *